United States Patent [19]

Wachter

[11] Patent Number: 4,744,940
[45] Date of Patent: May 17, 1988

[54] APPARATUS FOR COMPACTING NUCLEAR REACTOR FUEL RODS

[75] Inventor: William J. Wachter, Glenshaw, Pa.

[73] Assignee: U.S. Tool & Die, Inc., Allison Park, Pa.

[21] Appl. No.: 4,609

[22] Filed: Jan. 20, 1987

Related U.S. Application Data

[63] Continuation-in-part of Ser. No. 814,481, Dec. 30, 1985, which is a continuation-in-part of Ser. No. 291,230, Aug. 10, 1981.

[51] Int. Cl.[4] .............................................. G21C 19/32
[52] U.S. Cl. .................................. 376/261; 294/87.1; 294/119.3; 294/906
[58] Field of Search ............... 376/261, 260, 264, 268, 376/271, 272; 294/87.1, 119.3, 906, 63.2, 98.1; 414/146, 746; 29/400 N, 723, 426.2, 426.3

[56] References Cited

U.S. PATENT DOCUMENTS

| 2,355,004 | 8/1944 | McCulloch | 294/87.24 |
|---|---|---|---|
| 2,488,826 | 11/1949 | Peebles | 294/87.1 |
| 2,784,997 | 3/1957 | Baumann | 294/87.1 |
| 3,834,117 | 9/1974 | Gift | 294/119.3 |
| 3,881,762 | 5/1975 | Zappia | 294/119.3 |
| 3,904,048 | 9/1975 | Van Santen et al. | 376/271 |
| 4,441,242 | 4/1984 | Hicken et al. | 376/261 |
| 4,551,299 | 11/1985 | Shields | 376/261 |
| 4,687,245 | 8/1987 | Formanek | 376/271 |

Primary Examiner—Deborah L. Kyle
Assistant Examiner—Daniel Wasil
Attorney, Agent, or Firm—Clifford A. Poff; Thomas H. Murray

[57] ABSTRACT

An apparatus for withdrawing spent fuel rods from a nuclear fuel rod assembly into a different nuclear fuel rod container wherein the spent fuel rods have a higher fuel rod density, whereby a greater number of spent fuel rods can be stored in a water-storage pool. The individual rods are moved from a fuel assembly and through a transition funnel by movable grippers at opposite ends of the funnel. One movable gripper reciprocates between gripping and release positions in a gap between the fuel assembly and the transition funnel. A stationary gripper can be located in the gap at the entry side of the funnel to hold the fuel rods while the movable gripper returns from a release position to the gripping position. Both grippers include members which can be pressed into frictional engagement with the spaced apart array of fuel rods. All of the fuel rods are withdrawn concurrently and are merged toward one another into a tighter array within the transition funnel and emerge as a bundle. A movable and a stationary bundle gripper are provided between the funnel and the storage container to advance the bundle of fuel rods into the container.

5 Claims, 7 Drawing Sheets

APPARATUS FOR COMPACTING NUCLEAR REACTOR FUEL RODS

CROSS-REFERENCE TO RELATED APPLICATIONS

This application is a continuation-in-part of application Ser. No. 814,481, filed Dec. 30, 1985 which is a continuation-in-part of application Ser. No. 291,230, filed Aug. 10, 1981.

FIELD OF THE INVENTION

This invention relates to an apparatus for compacting spent nuclear reactor fuel rods, and more particularly to an improved apparatus for transferring a spaced apart array of such spent fuel rods from a fuel assembly storage.

STATEMENT OF THE PRIOR ART

Nuclear reactor installations employ nuclear fuel materials in the form of fuel rods which are supported in fuel rod assemblies. The fuel rods are metal pipes which are filled with nuclear fuel material and are about 0.4–0.6 inch in diameter and from 8 to 15 feet in length. Groups of 64, 128, 220 or more such fuel rods are assembled in a fuel rod assembly which includes grids for alignment and support of the fuel rods, a lower end fitting, an upper end fitting, and guide tubes. The fuel rod assembly is introduced into a nuclear reactor as the fuel source. After the nuclear fuel in the fuel rod assembly is spent to a pre-established level, the entire fuel rod assembly is withdrawn from the nuclear reactor and stored vertically in appropriate metal racks in a wet pool until the radioactive properties have dissipated sufficiently for transfer to other storage locations.

Within the fuel rod assembly, the individual fuel rods are spaced apart in a pre-established array, usually a rectangular array. The fuel rod assemblies are spaced apart in the metal racks and are maintained under water for the purpose of moderating or slowing the neutrons. In the fuel rod assembly, the ration of cross-sectional area of fuel rod to cross-sectional area of water is approximately 1:1.

At the present time, spent nuclear fuel rod assemblies are withdrawn from the nuclear reactors and are stored vertically in appropriate storage racks under water in storage pools without any deliberate change in the fuel rod assembly. The fuel rod storage pools are filled with the spent fuel rod assemblies whose activity has dissipated as a result of extended storage in the pool.

A number of suggestions have been made for removing long-term storage fuel rod assemblies from the pool and for withdrawing individual spent fuel rods from the fuel rod assembly and thereafter for assembling the individual spent fuel rods in new containers or canisters wherein the fuel rods are more closely aligned, i.e., more densely compacted, and for returning such newly-filled canisters to appropriate storage racks within a water storage pool for long-term storage or until appropriate fuel recovery processing is economically feasible.

Some of the anticipated difficulties with the proposed fuel rod compacting processes which have been suggested arise form the knowledge that the fuel rods are twisted and bent out of alignment as a result of their long-term exposure in nuclear reactors. In some cases, the distortion may be as much as 5 inches in an 8-foot long rod. Such permanent distortion of the fuel rods will interfere with the proposed alignment techniques. The casing of the fuel rods should be handled by using procedures and equipment designed to accommodate embrittlement due to irradiation in the nuclear reactor.

A further problem is that the long, thin fuel rods are shipped and therefore likely to impact with each other when pulled from the fuel assembly. Such impacting could cause fuel rod breakage. Moreover, the fuel rods may be difficult to manipulate. A still further problem relates to the inherent safety of compacting spent fuel rods. There is a possibility that the fuel rods might become spaced apart by a critical distance while removed from the fuel rod assembly and before compaction and confinement in a storage canister Moreover, the fuel rods might be dropped in the water pool or broken due to embrittlement during multimanipulation before confinement in a storage container. Such possibilities should be precluded.

SUMMARY OF THE INVENTION

According to the present invention, an apparatus is provided for transferring fuel rods from a fuel rod assembly in an underwater pool or in a hot cell to a fuel rod canister and vice versa, when desired, so that the density of the fuel rods in a canister greatly exceeds the density of fuel rods in the fuel rod assembly. A fuel rod consolidation funnel may be used to alter the spacing between the array of fuel rods during the transfer procedure. The apparatus for transferring adequate gripping forces can be produced to advance the fuel rods in the presence of frictional and other forces action on the fuel rods during the transfer process. The apparatus further embodies a design to establish alignment between fuel rod gripper openings in a gripper with the spaced apart array of fuel rods.

According to the invention, an end of a fuel rod assembly is removed by cutting or otherwise and grippers of a movable gripper assembly are passed between rows of the exposed end portions of the array of fuel rods to simultaneously grip the fuel rods. The grippers are housed in a gripper plate having a face plate reaction wherein a web section separates passageways for fuel rods. Elongated, expandable grippers are seated in the face plate to extend across the face plate section so that expansion of the expandable grippers force fuel rods engaged therewith against a wall forming a fuel rod passageway. The gripper assembly is reciprocated along a rectilinear path between a fuel rod gripping position at the exposed end of the fuel assembly and a remote fuel rod release position which is adjacent an entry end of a fuel rod directing chamber such as a transition funnel which has fuel rod receiving openings corresponding to the array of fuel rods in the fuel rod assembly. The operation of the reciprocating gripper serves to withdraw an increment of length of all the fuel rods in unison from the fuel assembly in one axial direction for entry and passage in the fuel rod directing chamber. The transition funnel at its fuel rod discharge end has a relatively narrow cross section which corresponds to the cross section of the desired compacted bundle of fuel rods presented to the storage container. For each individual fuel rod, there can be a separate guide within the transition funnel for directing a fuel rod from the fuel rod assembly through the transition funnel into a permanent storage container.

The fuel rod consolidation process is thus carried out by positioning the transition funnel between the fuel rod assembly and a permanent storage container in a tandem arrangement so that the spent fuel rods pass in only one direction directly from the fuel rod assembly through the transition funnel into the storage container. This tandem arrangement of components can be provided in a hot cell or it can be provided beneath the water surface in a water pool. In the either event, the spent fuel rods move along a generally horizontal path or a generally vertical path. In the latter event, the fuel storage container can be located either above or below the transition funnel. Thus, the storage container can be positioned so that the spent fuel rods either move upwardly into the storage container or downwardly into the storage container. The passageways through the transition funnel direct the spent fuel rods into pre-established storage positions in a compacted array of fuel rods within the container.

The present invention further provides guide tube openings dispersed in the array of fuel rods to receive and portions of guide tubes which are included in the fuel rod assemblies for receiving control rods. The guide tubes are utilized in this instance to align and maintain alignment between the opening in the gripper and the face rods.

A second gripper is arranged to reciprocate along a rectilinear path in a gap established between the discharge end of the transition funnel where the fuel rod bundle is gripped and the entry end of a storage canister where the fuel rod bundle is released. The second gripper can embody a construction for gripping the entire bundle of fuel rods since they are in a compacted array. The fuel rods are advanced into the storage container by reciprocating the second gripper in the same manner as the reciprocating motion of the first gripper. In some instances, it may be desirable to provide additional retention means to support the fuel rods during the return movement of each of the first and second grippers. Such retention means can be located at the entry side of the transition funnel and/or storage container. The retention means may, when desired, include the use of conventional grids provided in the fuel assembly to support the fuel rods at various spaced-apart locations along the length of the fuel assembly. In this regard, such grids conventionally provide resilient spring clips to apply a spring tension force against the outer cylindrical surface of the fuel rod. The spring forces can be utilized to prevent unwanted axial movement of the fuel rods while the grippers are returned from a release position to a gripping position as described hereinbefore. When desired, a gripper at the entry and or exit end of the transition funnel can be attached to the funnel and the funnel with one or both grippers attached thereto can be reciprocated along a rectilinear path between gripping and release positions to move the fuel rods from the fuel rod assembly.

By providing fuel rod containers of the same cross-sectional dimensions as the fuel rod assemblies, the containers can be stored in the same underwater fuel rod storage racks which have been employed for the fuel rod assemblies. In addition, it is possible to transform the consolidated rods to other geometries, i.e., rhombic, to maximize storage in a cylindrical container which can be used for transporting and/or permanent storage at a local or remote storage site.

Accordingly, it is an object of this invention to provide and improve gripper and/or guide spent fuel rod assembly directly into a fuel rod container for compact storage of the spent fuel rods.

It is a further object of this invention to carry out the described apparatus wherein a reciprocating gripper moves a distance corresponding to only a small increment of the fuel rod lengths which minimizes the space required to consolidate the fuel rods while causing the fuel rods to move unidirectionally from a fuel rod assembly to a consolidation funnel.

BRIEF DESCRIPTION OF THE DRAWINGS

These features and advantages of the present invention as well as others will be more fully understood when the following description is read in light of the accompanying drawings, in which.

DESCRIPTION OF THE PREFERRED EMBODIMENTS

Figure 1:
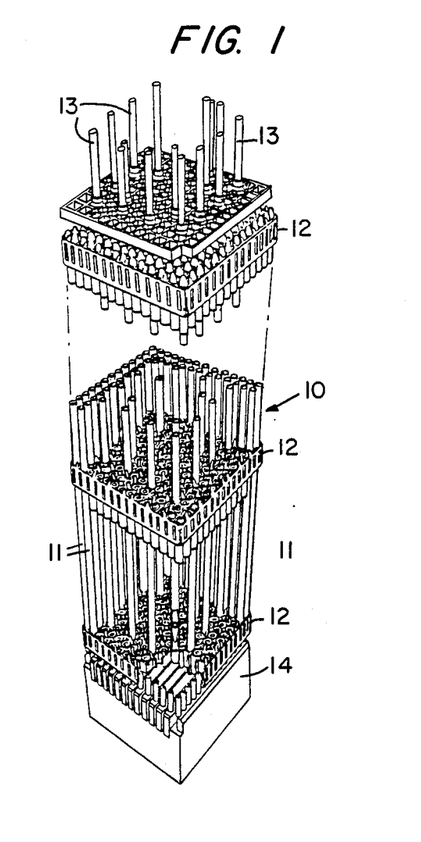
FIG. 1 is a perspective illustration of a typical fuel rod assembly.

Referring to FIG. 1, a typical fuel rod assembly 10 includes an array of individual fuel rods 11 (180 rods are shown in FIG. 1), support grids 12, control rod guide tubes 13 and a container housing member 14. The individual fuel rods 11 (sometimes also called fuel pins) are about 0.4–0.6 inch in diameter and about 8 feet long in one type of nuclear reactor installation and the fuel rods are about 15 feet long in another type of nuclear reactor installation. The support grids 12 are spaced apart at pre-established distances along the fuel rod assembly to position and support the fuel rods. The typical form of support grid will be described in greater detail hereinafter.

In the particular fuel rod assembly shown in FIG. 1, there are 16 control rod guide tubes 13 at selected sites in the fuel rod array. The tubes 13 are used to position control rods used to control the reactivity of the fuel assembly in a manner per se well known in the art. The guide tubes serve an addition and new function of guiding a fuel rod gripper during reciprocating movement as well be hereafter more fully described.

The fuel rod assembly 10 is withdrawn from a nuclear reactor after the nuclear fuel within the fuel rod assembly 11 has been spent. Thereafter, the fuel rod assembly 10 is stored in appropriate storage racks under water in storage pools until its activity is dissipated.

The purpose of the present invention is to move the fuel rods in the direction of the length from the fuel assembly to a consolidation fuel compacting the fuel rods 11 after their activity has dissipated and to store the fuel rods in a new and different container wherein the fuel rod spacing is altered. The fuel rods as presented in the fuel rod assembly for use in a nuclear reactors are intended to be active in the presence of slow neutrons. The fuel rods in operation are spaced apart by predetermined distances so that released neutrons can be slowed to an effective velocity for atomic reactions. Water is an effective moderator for this purpose. As the fuel rods are brought closer together, there is insufficient water between fuel rods to retard the velocity of the neutrons. Hence, the reactivity of the fuel rod assembly is reduced because the high velocity neutrons pass through the installation without sufficient retardation to cause any significant atomic collisions. Thus, the reactivity is reduced as the fuel rods are brought together.

Figure 2:
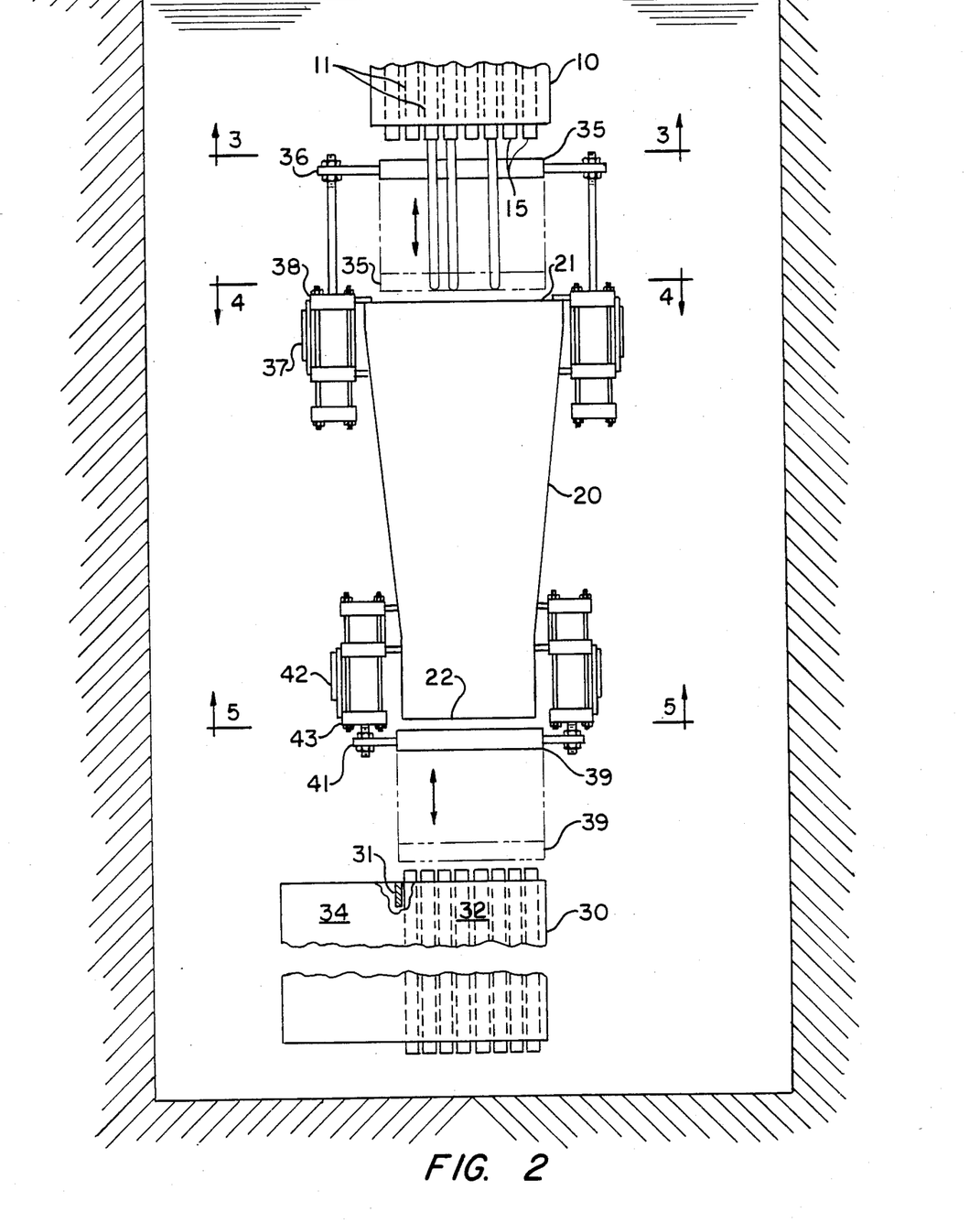
FIG. 2 is a broken, side elevational view of a fuel rod assembly, a transition funnel and a container illustrating the method and apparatus of the invention.

In the embodiment of the present invention shown in FIG. 2, the fuel rod assembly 10 is supported beneath the water surface in a water pool by a vertically-arranged structure which can be a so-called "strong back". Beneath the fuel assembly in a spaced-apart tandem arrangement is a transition funnel 20 and therebelow a storage container 30. Initially, a suitable length of an end portion of the housing member 14 is removed so that end portions 15 of the individual fuel rods 11 and end portions 16 of guide tubes 13 are exposed. The end portion of the housing member is removed by cutting or otherwise. One way of removing the end portion is to cut the end of the housing member 14 with an air-powered underwater band saw. In some fuel rod assemblies, a lower end portion may be dismantled by removing the bolts or other fastening devices which connect it to the main frame. After the end portion of the assembly is removed, the fuel assembly is arranged so that the lower ends 15 of the individual fuel rods 11 and guide tube ends are exposed as shown in FIG. 2.

Figure 3:
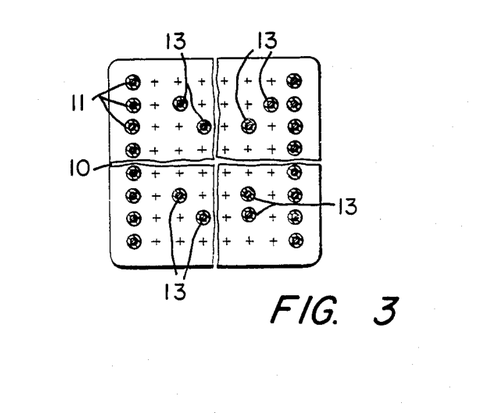
FIG. 3 is a cross-sectional view taken along line 3—3 of FIG. 2.
Figure 4:
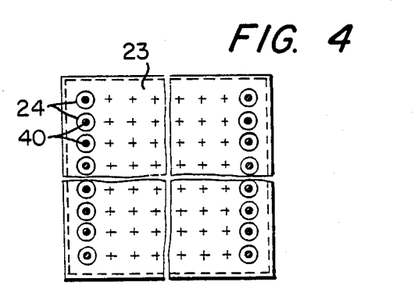
FIGS. 4 and 5 are plan views of the bottom end and top end, respectively, of the transition funnel of FIG. 2.
Figure 5:
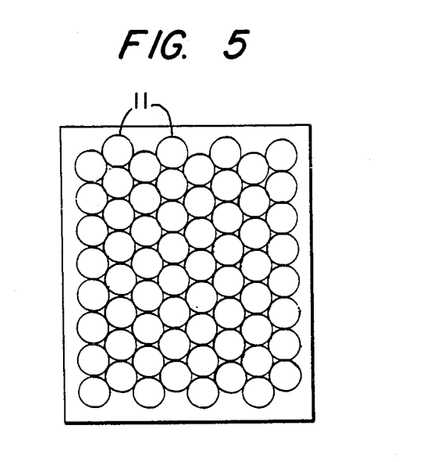

FIG. 3 illustrates the spaced-apart pattern of fuel rods forming a rectangular array of fuel rods 11 with dispersed guide tubes 13 within the fuel rod assembly. The transition funnel 20 has an upper end 21 and a lower end 22. The upper end 21 as shown in FIG. 4 has a generally square grid corresponding to the array of the fuel rods 11 and guide tubes 13 as shown in FIG. 3. At the upper end 21 is a grid 23 having openings for individual tubes 24 corresponding in number and array with the exposed lower ends 15 of the fuel rods. The transition funnel tapers from its upper end 21 toward its lower end 22. At the lower end 22, the transition funnel 20 as shown in FIG. 5 has a grid 25 with openings for receiving the ends of the tubes 24 in a desired array. It will be observed that the array of the tube openings 24 in the grid 25 is an equilateral triangle—the preferred array. It will also be observed that fuel rods are relocated to occupy the sites of grid tubes 13 in the array of the fuel assembly;

Below the transition funnel 20 is the container 30 having outer dimensions corresponding to the outer dimensions of the fuel rod assembly 10. The container 30 preferably is a metal rectangular box having a length slightly greater than the length of the fuel rods 11 and having sufficient cross-sectional area to receive the compacted fuel rods from the fuel rod assembly 10 in approximately half of its cross-sectional area. In one embodiment, a vertical baffle is provided to divide the container 30 into parallel chambers 32, 34. All of the fuel rods 11 from the fuel rod assembly 10 can be confined in the chamber 32 as shown in FIG. 2. All of the fuel rods from another fuel rod assembly can be confined in the chamber 34.

In FIG. 2, there is schematically illustrated a spaced-apart relation between the tandem arrangement of the fuel assembly 10 and the transition funnel 20 as well as the transition funnel 20 and the container 30. According to the present invention, there is provided movable grippers which can reciprocate between gripping and releasing positions to advance fuel rods in a step-like manner from the fuel assembly. Typically, it is sufficient to reciprocate each of the grippers through a distance of 2 to 4 inches. In the space between the fuel assembly and the transition funnel, there is provided a gripper 35 which is supported and guided for reciprocating movement by the supported end portions of the guide tubes and by the same support structure which supports the fuel assembly and the transition funnel. An arm 36 extends from the gripper and the rod end of a piston and cylinder assembly 37 is secured to the arm 36. The piston and cylinder assembly is supported by a bracket 38. It is preferred to provide the same arrangement of a piston and cylinder assembly at the opposite lateral side of the gripper 35. The piston and assembly 37 forms an actuator which displaces the gripper along a rectilinear path from the position shown in FIG. 2 to a position shown by phantom lines and identified by the reference numeral 35'. In a similar manner, there is provided a movable gripper 39 for gripping fuel rods at the discharge end of the transition funnel. The gripper is guided for rectilinear movement and supported by the same support structure which supports the container 30 and the transition funnel 20. Extending from one lateral side of the gripper 39 is reciprocated from the position shown in FIG. 2 by the piston and cylinder assembly 42 to a position shown by phantom lines and identified by the reference numeral 39'. During the time while the fuel rods are advanced downwardly from the fuel assembly 10 by the gripper 35, means are preferably utilized to avoid unrestrained displacement of the fuel rods in the direction of their length.

Figures 6, 8:
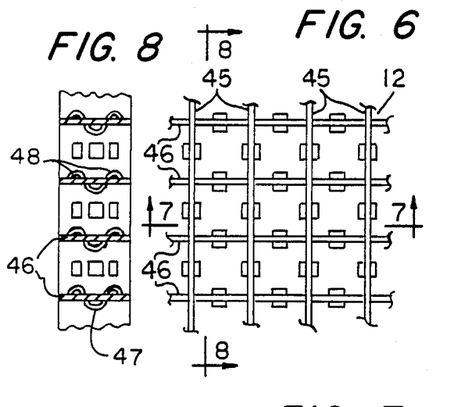
FIG. 6 is an enlarged, partial plan view of a typical grid used to support fuel rods in a fuel assembly.
FIG. 8 is a sectional view taken along line 8—8 of FIG. 6.
Figure 7:
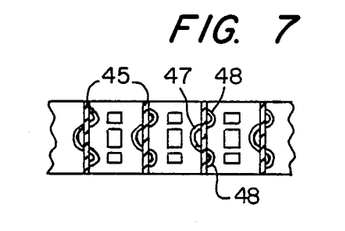
FIG. 7 is a sectional view taken along line 7—7 of FIG. 6.
Figure 9:
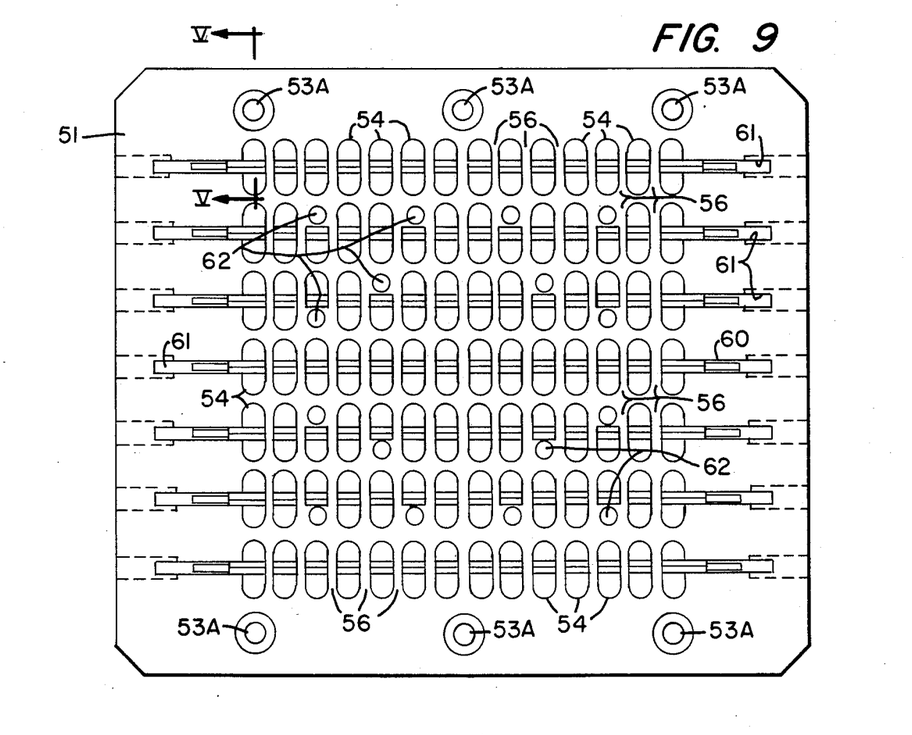
FIG. 9 is a plan view of a gripper of the present invention for releasably engaging a spaced-apart array of fuel rods.

In the embodiment of the present invention shown in FIG. 2, the means utilized for this purpose comprises the fuel assembly support grids 12 which are illustrated in greater detail in FIGS. 6-8. In this regard, the fuel rods need only be restrained against uncontrolled axial movement during displacement of the leading ends of the fuel rod from the position in which they reside when the lower end of the fuel rod assembly is removed until the array of fuel rods enters the upper end 21 of the transition funnel. Thereafter, movement of the fuel rods is constrained due frictional resistance in the transition funnel to repositioning of the fuel rods from a spaced-apart, rectangular array to a triangular array as described hereinbefore and shown in FIGS. 4 and 5, respectively. A typical support grid 12 is shown in FIGS. 6–8 and takes the form of spaced-apart, parallel plates 45 between which there is welded or otherwise secured spaced-apart, parallel plate sections 46 which form a square-shaped array of openings into which, inter alia, the fuel rods pass.

As best shown in FIGS. 7 and 8, the plates 45 and plate sections 46 each has a central web section 47 formed by punching or otherwise upsetting the metal along a major face area of the plates 45 and plate sections 46. At opposite ends of the web section 47, there are smaller dimensioned upset web sections 48. Sections 47 and 48 protrude into the open spaces of the array for frictional engagement with the outer face surfaces of the fuel rods. The resistance against axial movement by the fuel rod assembly afforded by frictional engagement with the sections 47 and 48 is sufficient to prevent random and uncontrolled movement of one or more fuel rods. Even if, however, a fuel rod breaks loose from supporting engagement with the support grids, the moving fuel rod will merely enter the transition funnel where the required path of movement to undergo the consolidation process exerts sufficient frictional force on the rod to prevent substantial advancement of the rod through the transition funnel. The inhibition against axial movement provided by the support grids assures an orderly movement of the entire array of fuel rods from the fuel assembly into the transition funnel while at the same time, the arrangement of parts is such that the fuel rods of the array cannot separate from one another by distances greater than the spacing between the fuel rods in the fuel assembly.

Figure 10:
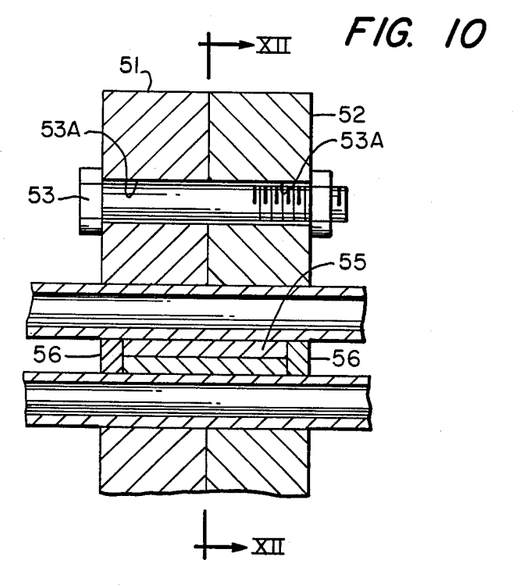
FIG. 10 is a sectional view taken along line 10—10 of FIG. 9.
Figure 11:
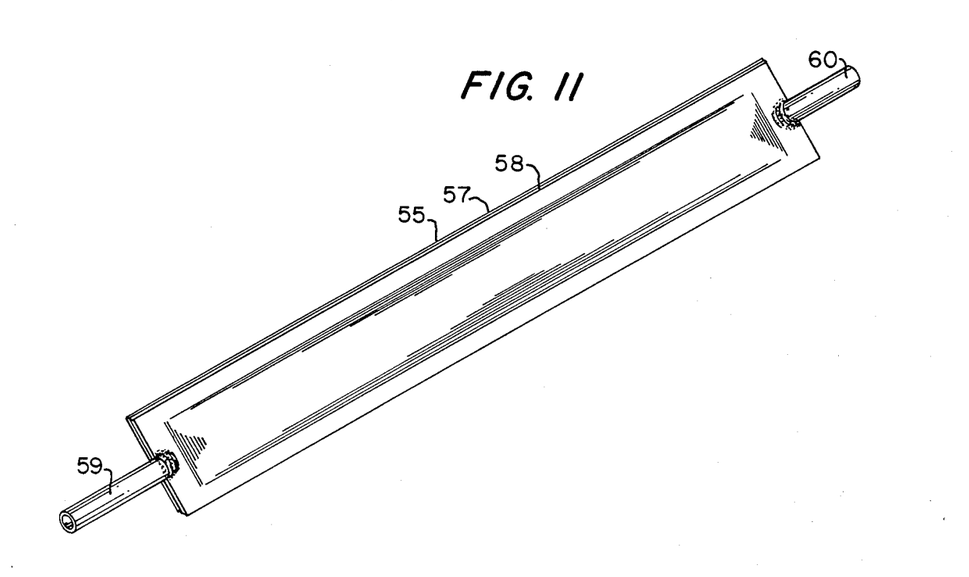
FIG. 11 is an isometric view of a gripper diagram forming part of the gripper shown in FIG. 9 for releasably engaging an array of fuel rods.
Figure 12:
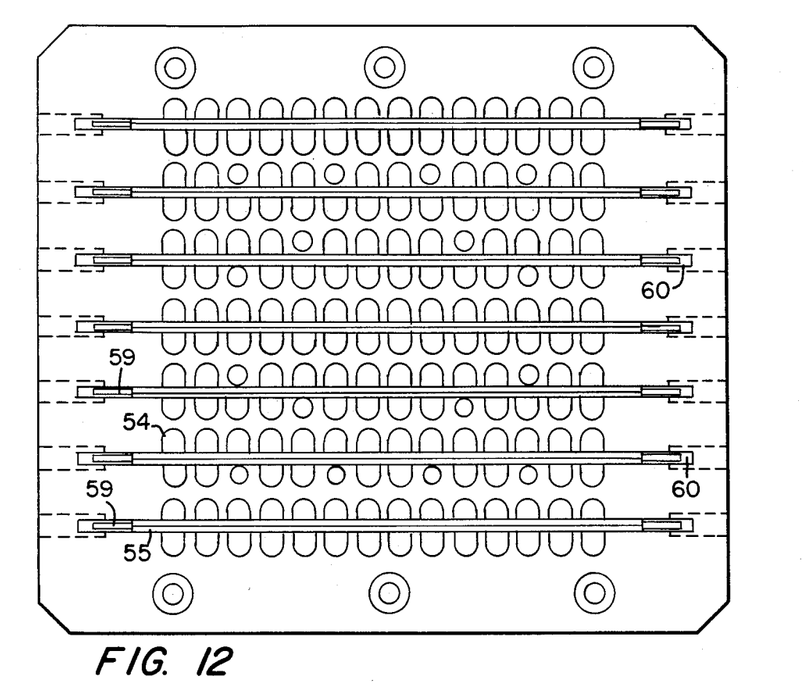
FIG. 12 is a plan view taken along line XII—XII of FIG. 10.

The gripper of the present invention in the preferred form embodies a construction of parts as shown in FIGS. 9–12 which includes gripper plate 51 and 52 interconnected by fastener 53 which are arranged to extend through aligned openings at outer peripheral portions of the plates 51 and 52. In this way, the plates are clamped together in a face-to-face relation as best shown in FIG. 10. The construction of each plate 51 and 52 is the same and includes a spaced-apart array of elongated slots 54 having semicircular ends. Slots 54 are elongated to an extent that a fuel rod can be received in each of opposite semicircular ends while leaving a gap between the fuel rods. The gaps between fuel rods in rows of slots are aligned to extend in a transverse relation across each plate 51 and 52. An expandable diaphragm 55, is located in each row of slots. An important feature of the embodiment of the present invention shown in FIG. 9 resides in the fact that the slot in which the expandable diaphragm resides is formed in each of the plates 51 and 52 and further that the elongated slots are strengthened against a separating force applied against the semicircular ends due to the force applied against the fuel rods by the expandable diaphragm. This reinforcement comprises web sections 56. As best shown in FIG. 10, the web sections form in walls of a groove that is machined in each of the plate 51 and 52 to support the expandable diaphragm. The side walls of the groove form support sites for the diaphragm along its lengths. The diaphragm shown in FIG. 11 is made up of two rectangular sheets of metal 57 and 58 having a rectangular configuration and joined together by welding about the periphery of the sheets. A space between the sheets is thus formed into which pressurized fluid such as water can be introduced through a tubular end fitting 59. The end fitting is attached to the diaphragm by a welding and communicates with the interior space between the sheets. A support arbor 60 extends from the end of the diaphragm which is opposite the fluid entry duct. The tubular end fitting and arbor extend along end portions 61 of the milled slots. Fluid conducting ducts extend from a manifold, not shown, to each inlet pipe for supplying pressurized fluids to the expansible diaphragms. It will be noted in FIG. 9 that certain sites identified by reference numeral 62 comprise guide tube openings that are intermingled in the array of fuel rods. The guide tubes 13 can be passed through the openings 62 in the plate. As is apparent from FIG. 1, the guide tubes have an extended end portion which is sufficient so that the gripper can be guided by these tubes during the reciprocating movement between a gripping and releasing positions. As noted previously, the gripper is reciprocated a short distance to advance the fuel rods in an incremental fashion into the consolidation funnel from the fuel assembly.

Figure 13:
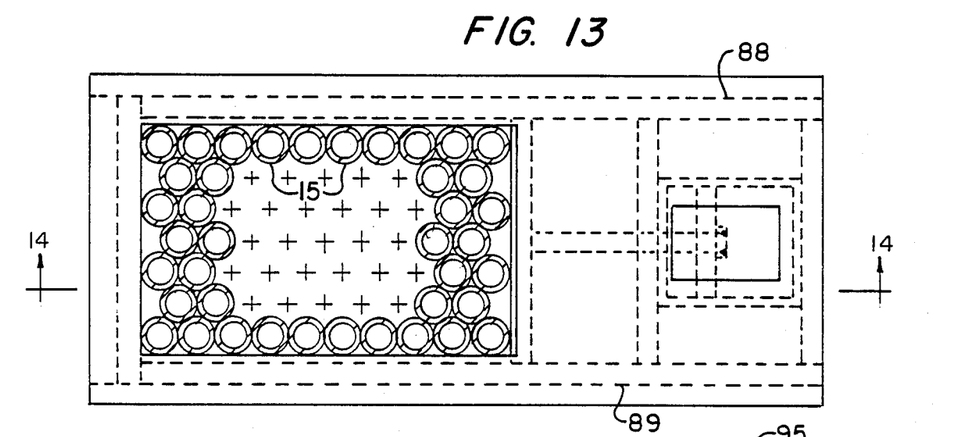
FIG. 13 is a plan view of a gripper for releasably engaging a compacted array of fuel rods.
Figure 14:
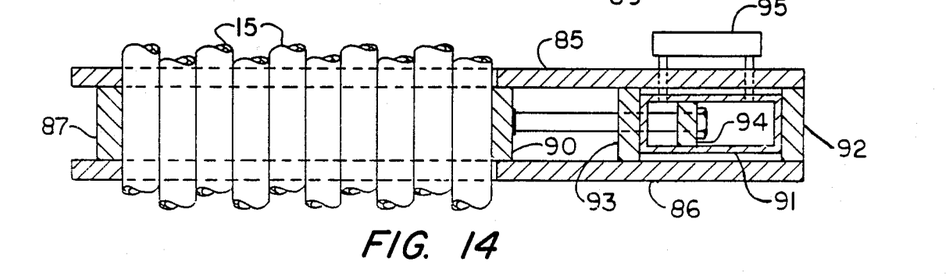
FIG. 14 is a sectional view taken along line 14—14 of FIG. 13.

The gripper 39 used to move the compacted bundle of fuel rods may embody a construction shown in FIGS. 13 and 14 in which spaced-apart plates 85 and 86 are joined together by spacer plates 87, 88 and 89. Plates 85 and 86 each includes a rectangular opening 90 which is dimensioned to correspond to the compacted array of fuel rods emerging from the end 22 of transition funnel 20. Plates 88 and 89 extend in a generally parallel relation and arranged therebetween is a gripper plate 91 which can be forced into compressive engagement with the bundle of fuel rods by operation of a piston and cylinder assembly 92 that is supported in a cavity formed between anchor plates 93. As shown in FIG. 14, chambers within the piston and cylinder assembly 94 at opposite sides of the piston 94A are connected by conduits to a valve 95 to adjustably control the flow of pressurized fluid to the piston and cylinder assembly so that the gripper plate 91 can be pressed into engagement with a bundle of fuel rods to insure gripping of the fuel rod bundle.

Figure 15:
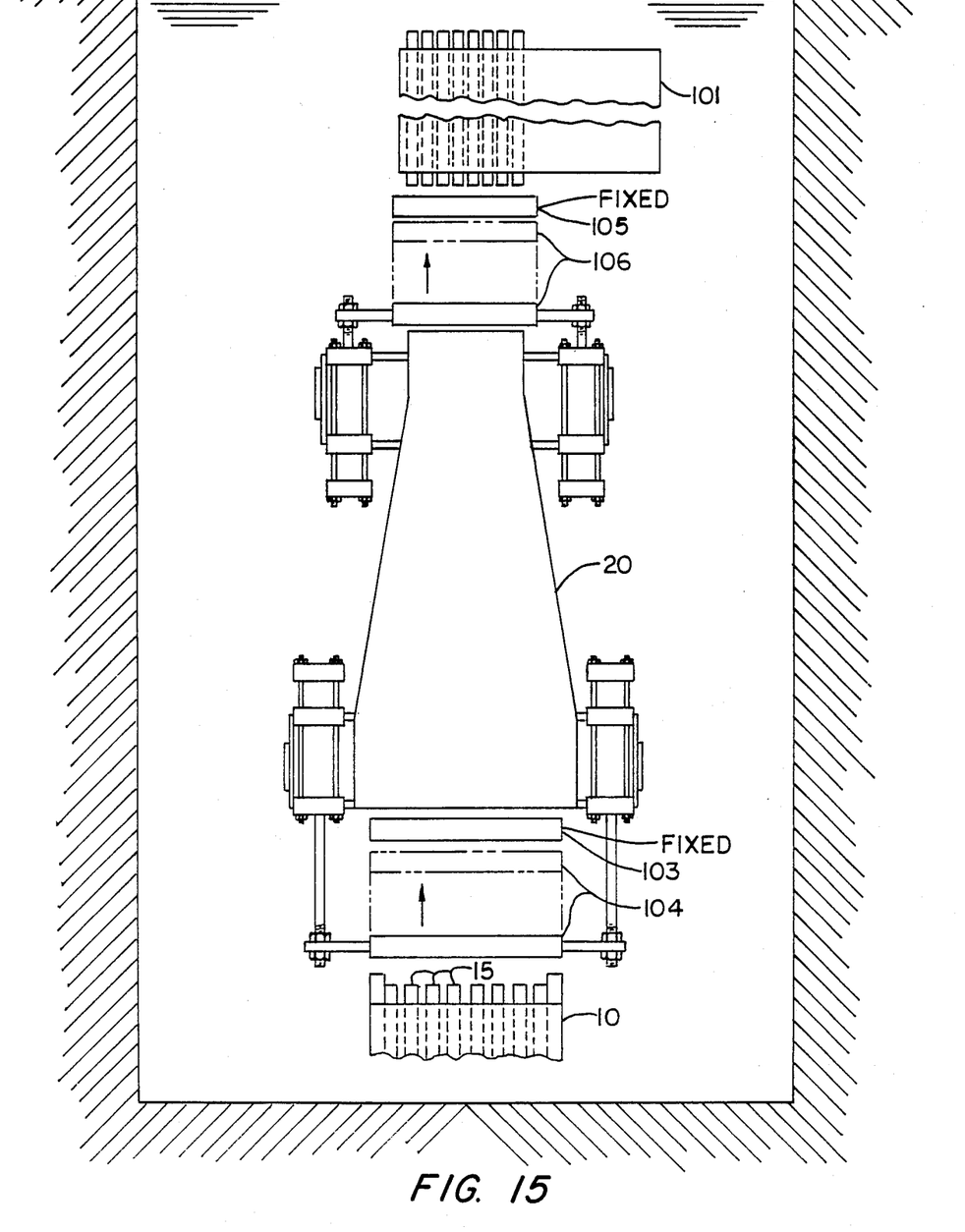
FIG. 15 is a view similar to FIG. 2 and illustrating an arrangement of fuel rod assemblies, a transition funnel and a container disposed for upward vertical movement of fuel rods.

In FIG. 15, there is illustrated a further arrangement of apparatus of the present invention. Spaced below the surface of water identified by reference numeral 100 in a water pool there is tandemly arranged a canister 101 and therebelow in a spaced-apart relation is the discharge end 22 of the transition funnel 20. The upper end of the fuel assembly 10 is located below the entry end of the transition funnel. In the space between the transition funnel an the fuel assembly, there is arranged two grippers 103 and 104. Gripper 103 is supported in a stationary manner by the structure, e.g., a strong back, which also supports the fuel assembly, transition funnel and canister. Gripper 104 is supported by the structure to reciprocate in the space between the fixed gripper 103 and the fuel rod assembly. In the space between the canister 101 and the transition funnel 20, there is arranged two bundle grippers 105 and 106. Gripper 105 is supported in a stationary manner by the strong back and gripper 106 is supported by this structure to reciprocate in the space between the fixed gripper 105 and the transition funnel 20. Each of the grippers 103 and 104 may embody a construction according to any one of the embodiments described hereinbelow with respect to gripper 35 and each of the grippers 105 and 106 may be constructed according to any one of the embodiments described hereinbefore for gripper 39.

Figure 16:
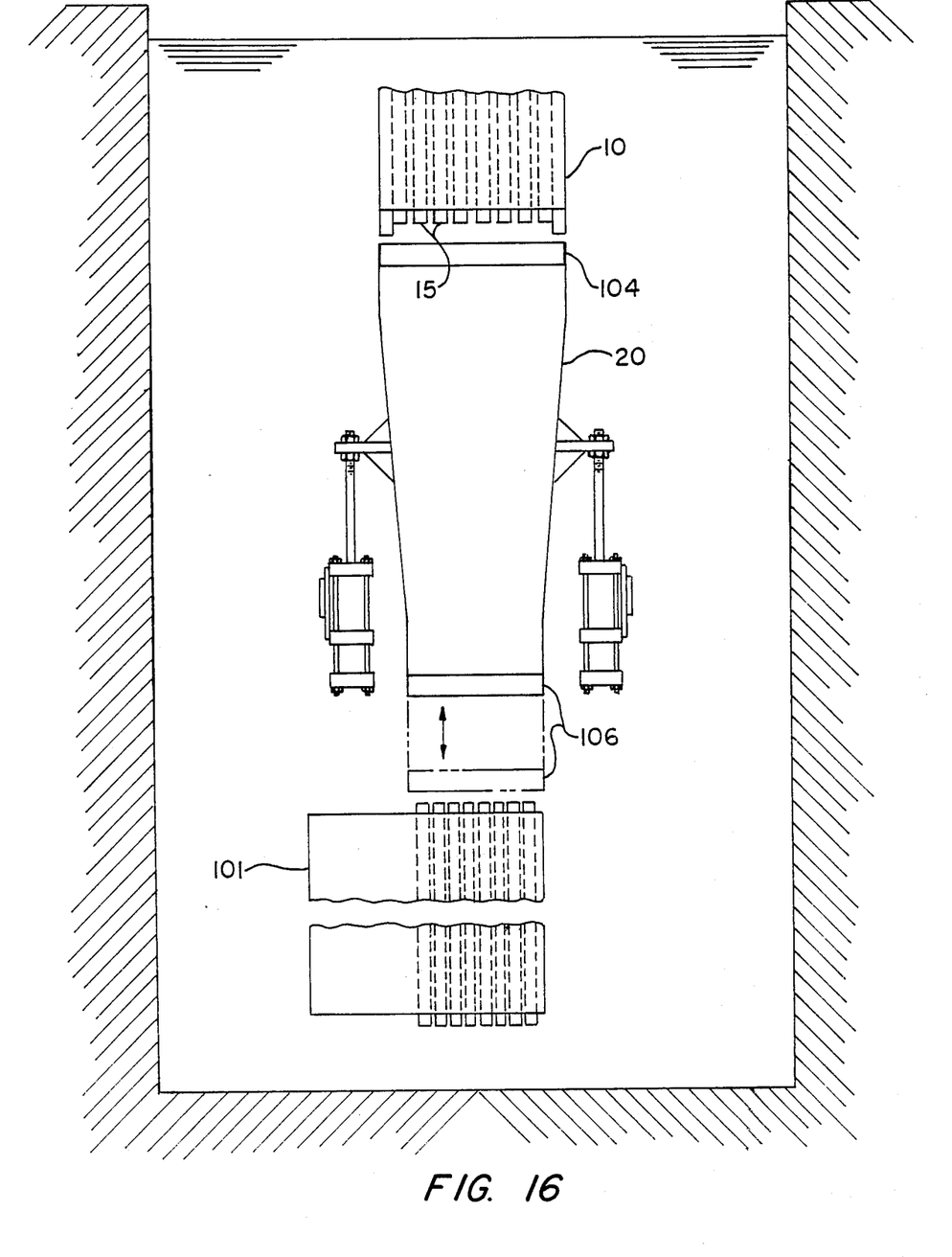
FIG. 16 is a view similar to FIG. 15 and illustrating an arrangement wherein grippers are reciprocated with a transition funnel.

A further arrangement of apparatus according to the present invention is shown in FIG. 16 which essentially differs from the embodiments hereinbefore described by the fact that grippers 35 and 39 are secured by brackets 108 and 109, respectively, to the transition funnel 20. The funnel is in turn provided with a support bracket 110 which extends to a support structure such as a strong back on which there is provided an elongated guide to slidably support the funnel for rectilinear reciprocating movement. A piston and cylinder assembly 111 is supported by the strong back so that the rod end of the piston and cylinder assembly is connected to a bracket or other structure extending from the funnel. By this arrangement of parts, the grippers at opposite ends of the funnel reciprocate between a rod gripping position and a rod release position. During return movement of the grippers and funnel, the fuel rods are supported against unwanted axial movement by support grids 12 and/or stationary grippers. The use of stationary grippers for this purpose is preferred and these grippers are identified by reference numerals 112 and 113. The stationary grippers like grippers 35 and 39 may embody a construction of parts according to any one of the embodiments hereinbefore described.

Figure 17:
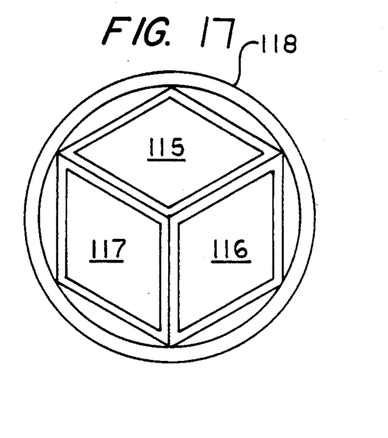
FIG. 17 is an end elevation view illustrating the arrangement of storage containers in cylindrical vessels.

As described hereinbefore, it is preferred to compact and transfer fuel rods from two fuel assemblies into a single canister which can be placed in a storage rack for long-term storage. The present invention is not limited thereto and can be utilized to transfer, for example, all the fuel rods from a fuel assembly into a single container having a square, rectangular, or other geometry to permit transportation or permanent storage at a local or remote storage site. In this regard, the triangular configuration of the array of fuel rods in the compacted bundle emerging from the transition funnel can be conveniently placed in a container having a rhombic cross-sectional configuration. In FIG. 17, three storage containers 115, 116, and 117 are illustrated each having a rhombic configuration for receiving a bundle of fuel rods. The rhombic configuration of the storage containers is particularly suitable for placement in a container having a cylindrical cross-sectional configuration. The cylindrical container is identified by reference numeral 118 and can be used for transporting fuel rods to a remote storage site for permanent storage of the fuel rods.

The spaced-apart tandem relationship between a fuel assembly, transition funnel and canister can, when desired, be provided in a hot cell wherein the components are arranged so that the fuel rods preferably move unidirectionally along a generally horizontal path. However, if the hot cell embodies a size sufficient to accommodate a vertical arrangement of components so that the fuel rods move unidirectionally along a vertical path, then the fuel consolidating procedure can be carried out by movement of the fuel rods along a path of travel which can be either upwardly or downwardly from the fuel assembly through the consolidating funnel and into the storage canister.

Although the invention has been shown in connection with a certain specific embodiment, it will be readily apparent to those skilled in the art that various changes in form and arrangement of parts may be made to suit requirements without departing form the spirit and scope of the invention.

I claim as my invention:

1. A gripper apparatus to move elongated nuclear fuel rods in the direction of the length thereof, said gripper apparatus including the combination of gripper plate means having web sections extending between and separating fuel rod passageways for an array of fuel rods, means supported by said gripper plate means for pressing said fuel rods in each passageway against end portions of the fuel rod passageway, said web sections strengthening said passageways against the gripping forces imposed on the fuel rods in each passageway, and reciprocative means to move said gripper plate means between spaced-apart gripping and release positions for advancing said fuel rods and increment of their length in one axial direction.

2. The gripper apparatus according to claim 1 wherein said gripper plate means includes guide tube passageways dispersed in the array of fuel rod openings to slidably receive end portions of guide tubes in the array of fuel rods.

3. The gripper apparatus according to claim 1 wherein said means for pressing includes expandable diaphragms between rows of said fuel rod passageways.

4. The gripper apparatus according to claim 3 wherein said expandable diaphragms include rectangular metal sheets welded together about the outer periphery thereof for defining an internal expansion chamber, and means for supplying a pressurized fluid medium to said an external expansion chamber.

5. The gripper apparatus according to claim 1 wherein said gripper plate means comprises two plate members connected together by fasteners and holding between them a plurality of spaced apart expandable diaphragms.

* * * * *